United States Patent [19]

Forgó et al.

[11] 4,076,697

[45] Feb. 28, 1978

[54] PROCESS FOR THE MANUFACTURE OF POLYADDITION PRODUCTS CONTAINING IMIDE GROUPS

[75] Inventors: Imre Forgó, Birsfelden; Alfred Renner, Munchenstein, both of Switzerland; André Schmitter, Hegenheim, France

[73] Assignee: Ciba-Geigy Corporation, Ardsley, N.Y.

[21] Appl. No.: 534,106

[22] Filed: Dec. 18, 1974

[30] Foreign Application Priority Data

Dec. 21, 1973 Switzerland ...................... 18049/73
Dec. 21, 1973 Switzerland ...................... 18050/73

[51] Int. Cl.$^2$ .............................................. C08G 73/12
[52] U.S. Cl. ............................................... 260/78 UA
[58] Field of Search .................... 260/78.4 R, 78 UA; 526/11.1

[56] References Cited

U.S. PATENT DOCUMENTS

| | | | |
|---|---|---|---|
| 2,818,405 | 12/1957 | Kovacic | 260/78 UA |
| 3,652,511 | 3/1972 | Vincent et al. | 260/78 UA |
| 3,669,930 | 6/1972 | Asahara et al. | 260/78 UA |
| 3,740,378 | 6/1973 | Crivello | 260/78 UA |
| 3,767,626 | 10/1973 | Laurent et al. | 260/78 UA |
| 3,910,859 | 10/1975 | Bargain | 260/78 UA |

FOREIGN PATENT DOCUMENTS 1,279,030  6/1972  United Kingdom.

*Primary Examiner* — Paul R. Michl
*Attorney, Agent, or Firm* — Luther A. R. Hall

[57] ABSTRACT

According to the invention, polyaddition products containing imide groups are manufactured by reacting certain polyimides (preferably maleimides) with polycarboxylic acids in the presence of basic compounds. The preferred embodiment (C) relates to the use of catalysts as basic compounds. In particular, tertiary amines, secondary amines or mixed tertiary-secondary amines can be used. A further embodiment (D) relates to the use of primary polyamines as basic compounds. In the latter case, the polyamine participates in the polyaddition mechanism, that is to say the molecules are incorporated into the polyaddition products. In this latter case, catalysts can also be used additionally.

The invention can be utilized particularly in the fields of surface protection, the electrical industry, laminating processes, and the manufacture of foamed plastics, and in the building industry.

34 Claims, No Drawings

PROCESS FOR THE MANUFACTURE OF POLYADDITION PRODUCTS CONTAINING IMIDE GROUPS

It is known that polymaleimides can be used as raw materials for the manufacture of polyaddition products and polymerisation products. Thus, for example, French Pat. No. 1,555,564 describes the polyaddition of N,N'-bis-maleimides with primary diamines and the curing of these pre-adducts by thermal polymerisation. The resulting polymers, containing succinimide radicals, are however inadequate for many applications. This is because they have a comparatively low heat distortion point. The flexural strength and impact strength of polyaddition products of this type is also inadequate in some cases. Furthermore, the corresponding manufacturing process also has disadvantages.

U.S. Pat. No. 3,741,942 claims polyaddition products obtained from bis-maleimides and organic dithiols. It is noticeable that the examples are restricted to those polymers which have been manufactured by polyaddition of aliphatic dithiols with the maleimides. These known polyadducts, and their process of manufacture, have all the great disadvantages characteristic of polymers containing sulphur. In particular, the strongly objectionable odour attributable to the dithiols, and the toxic action of the latter, should be pointed out. Since analogous objectionable characteristics also manifest themselves on combustion, and on high temperature decomposition, of these polyadducts containing sulphur, the materials can in most cases not be employed as constructional materials, especially in the building industry, in automobile construction and in aircraft construction. A further disadvantage of these products which should be mentioned is that the softening points are no higher than 110° to 170° C.

It is the object of the invention to provide polycondensation products, containing imide groups, which are based on polymaleimides, do not exhibit the disadvantages of the previously known polyadducts based on polymaleimide, and can be manufactured without handling materials which are harmful to health, and without objectionable odours.

The invention relates to a process for the manufacture of polyaddition products containing imide groups, which is characterised in that polyimides which contain, per molecule, at least two radicals of the general formula

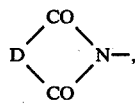

(I)

in which D denotes a divalent radical containing a carboncarbon double bond, are reacted with polycarboxylic acids in the presence of basic compounds at temperatures between 50° and 280° C.

According to a preferred embodiment (C) of the invention, the basic compounds employed are catalysts. The polyimides and the polycarboxylic acids are preferably employed in such amounts as to provide 0.3 to 1 equivalent of polycarboxylic acid per 1 equivalent of polyimide.

Basic catalysts present according to this preferred embodiment of the invention are in particular tertiary, secondary or primary amines, or amines which contain several different types of amino groups (for example mixed tertiary-secondary amines). These amine catalysts can be either monoamines or polyamines. Where primary and secondary amines are used, monoamines are to be preferred. The following substances may be listed as examples of such amine catalysts: diethylamine, tributylamine, triethylamine, triamylamine, benzylamine, N-methylpyrrolidine, tetramethyldiaminodiphenylmethane, quinoline, N,N-diisobutylaminoacetonitrile, N,N-dibutylaminoacetonitrile, imidazole, benzimidazole and their homologues.

The catalysts should be present in the reaction mixture in a concentration of 0.1 to 10% by weight, preferably of 0.5 to 5% by weight, the % by weight data relating to the total amount of the reacting starting components.

A further preferred embodiment (D) of the present invention is the use of primary polyamines as basic compounds, the procedure followed being such as to provide, per 1 equivalent of polyimide, such an amount of polycarboxylic acid and primary polyamine that the sum of the two latter substances is 0.3 to 1.5 equivalents and the equivalent ratio of the polycarboxylic acid to the polyamine is 1 : 4 to 4 : 1. Preferably, the equivalent ratio of the polycarboxylic acid to the polyamine should be 1 : 1 to 4 : 1.

The polyaddition, according to the invention is based entirely or partially on a novel linking of polyimide and polycarboxylic acid in accordance with the following chemical equation (I-S), in which, for simplicity, difunctional reactants and a bis-maleimide are employed.

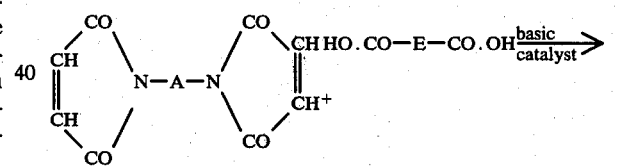

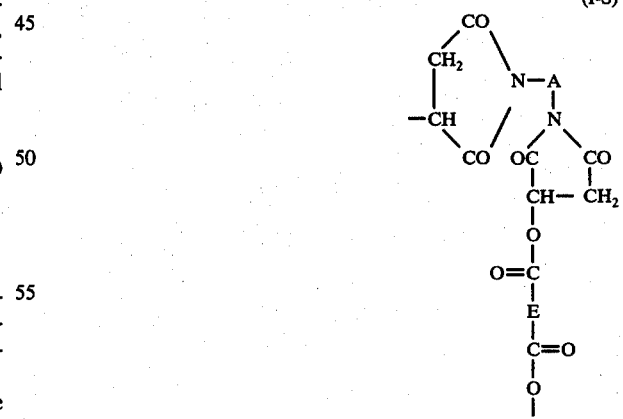

(I-S)

In the case of the preferred embodiment (D) of the invention, the polyaddition is further based on linking of polyimide and polyamine in accordance with the following chemical equation (I-A), in which, for simplicity, difunctional reactants and a bis-maleimide are again employed.

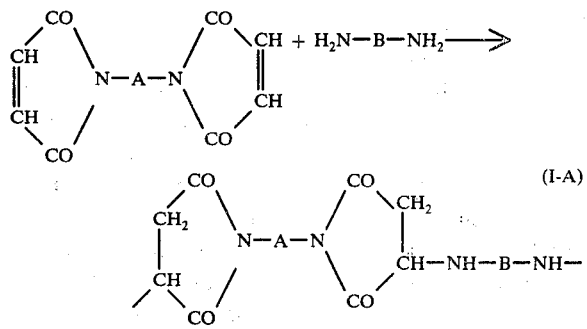

(I-A)

Both types of linking lead in the first instance to molecule chains, and in case (D) chain members produced according to equations (I-A) and (I-S) can be incorporated into the chains alternatively, in statistical distribution, or separately, that is to say each cumulatively in the form of a block polymer.

In the course of the reaction according to the invention, a crosslinking reaction also occurs, which is principally based on the homopolymerisation of the double bonds of the polyimides employed. This crosslinking is particularly effective if the number of double bond equivalents is greater than the sum of the amino equivalents and carboxyl equivalents. The formation of crosslinked products is particularly obvious if trifunctional or higher-functional starting products are used.

The polyaddition which takes place when carrying out the process according to the invention was particularly surprising, in the light of the relevant literature, with regard to the linking according to the scheme of the above equation (I-S).

High polymers which have excellent heat stability and, at the same time, good mechanical properties are obtained by means of the process according to the invention. It was particularly surprising that the novel linking according to equation (I-S), if appropriate in conjunction with the course of reaction according to equation (I-A), led to this favourable result.

Most of the polyimides which can be employed according to the invention are described in detail in the literature. They can be manufactured according to the methods described in U.S. Patent Specification No. 3,010,290 and G.B. Patent Specification No. 1,137,592, by reaction of the corresponding diamines with the unsaturated dicarboxylic acid anhydrides.

According to the invention it is possible to employ, inter alia, all the polyimides which have already been listed in French Pat. No. 1,555,564. Maleimides, that is to say polyimides of the formula (I), in which D denotes the divalent radical of the formula

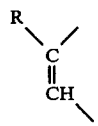

(II)

wherein R represents hydrogen or methyl, are particularly suitable.

A preferred embodiment of the invention is the reaction with polyimides which contain, per molecule, two or three radicals of the formula (I) and hence, in particular, the reaction with bis-maleimides and tris-maleimides.

Particularly suitable bis-maleimides which should be mentioned are compounds of the formula

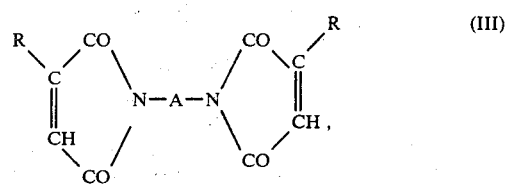

(III)

in which A denotes a divalent organic radical with 2 to 30 C atoms.

The radical A in the formula (III) preferably corresponds to the formula

(IV)

wherein $R^1$ represents one of the radicals $-CH_2-$,

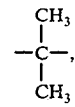

$-SO_2-$, $-SO-$, $-S-$ and $-O-$ and $n$ is 0 or 1.

The following substances may be mentioned as specific examples of known polyimides which are suitable for the process according to the invention: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, N,N'-4,4'-diphenyl ether-bis-maleimide, N,N'-4,4'-diphenylsulphone-bis-maleimide, N,N'-4,4'-dicyclohexylmethane-bis-maleimide, N,N'-α, α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, N,N'-γ, γ'-1,3-dipropylene-5,5-dimethyl-hydantoin-bis-maleimide, N,N'-4,4'-diphenylmethane-bis-itaconimide, N,N'-p-phenylene-bis-itaconimide, N,N'-4,4'-diphenylmethane-bis-dimethylmaleimide, N,N'-4,4'-2,2-diphenylpropane-bis-dimethyl maleimide, N,N'-hexamethylene-bis-dimethylmaleimide, N,N'-4,4'-diphenyl ether-bis-dimethylmaleimide and N,N'-4,4'-diphenylsulphone -bis-dimethylmaleimide.

It is, however, also possible to employ, for the process according to the invention, new bis-imides and tris-imides which have the following formula VII:

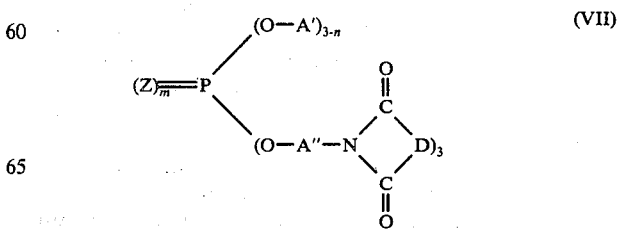

(VII)

In these, A and A″ denote aromatic radicals which, optionally, are substituted or are interrupted by an oxygen atom, an alkylene group or a sulphonyl group, D denotes the radical already defined above, Z denotes an oxygen atom or a sulphur atom, m denotes the number 1 or 0 and n denotes the number 2 or 3.

The new bis-imides and tris-imides of the formula VII are obtained by cyclising dicarboxylic acid monoamide compounds of the general formula VIII

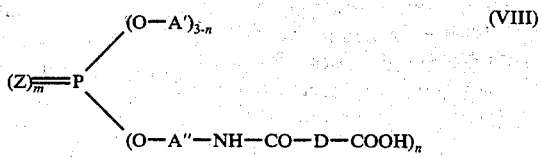

at temperatures below 90° C in the presence of catalysts (Na and K salts), with elimination of n mols of water, and subsequently isolating the compounds of the formula VII by precipitating the reaction product in water or an aqueous alcohol solution. The dicarboxylic acid monoamide compounds employed here can be manufactured according to known processes. In this context, attention should be drawn to U.S. Patent Specification No. 2,444,536 and G.B. Patent Specification No. 1,027,059.

Examples of such new maleimides suitable for the process according to the invention are: the N,N′-bis-maleimide of 4,4′-diamino-triphenyl phosphate, the N,N′-bis-maleimide of 4,4′-diamino-triphenyl thiophosphate, the N,N′,N″-tris-maleimide of tris-(4-aminophenyl) phosphate and the N,N′,N″-tris-maleimide of tris-(4-aminophenyl) thiophosphate.

According to the invention it is also possible to use mixtures of two or more of any of the abovementioned polyimides.

Preferably, dicarboxylic acids or tricarboxylic acids are employed as the polycarboxylic acids. Very suitable acids are aliphatic dicarboxylic acids with a total of 4 to 10 C atoms in the molecule, such as, for example, succinic acid, glutaric acid, adipic acid, 2,2,4-trimethyladipic acid, 2,4,4-trimethyladipic acid, pimelic acid and sebacic acid. Dicarboxylic acids, in particular adipic acid and sebacic acid, are particularly suitable.

Further polycarboxylic acids which can be employed for the process according to the invention are aromatic and cycloaliphatic acids, such as the phthalic acids, the substituted phthalic acids and cyclohexyldicarboxylic acids.

According to the invention, the polycarboxylic acids can also be employed as mixtures.

All polycarboxylic acids listed here, which are suitable as starting materials for the process according to the invention, have long been known to those skilled in the art and it is therefore superfluous to deal here with how they may be obtained.

According to the preferred embodiment (D) of the invention, aromatic or araliphatic di- or tri-primary amines with 2 to 40 C atoms in the molecule are employed preferentially. Diamines of the formula

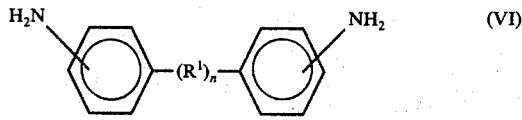

in which $R^1$ and n have the abovementioned meaning, are particularly suitable.

In principle it is also possible to employ all the polyamines which have already been listed in French Patent 1,555,564. In detail, the following polyamines suitable for the process according to the invention should be mentioned: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4′-triaminodiphenyl, 3,4,6-triaminopyridine, 2,4,4′-triaminophenyl-ether, 2,4,4′-triaminodiphenylmethane, 2,4,4′-triaminodiphenylsulphone, 2,4,4′-triaminobenzophenone, 2,4,4′-triamino-3-methyl-diphenylmethane, N,N,N-tri(4-aminophenyl)-amine, tri-(4-aminophenyl)-methane, tri-(4-aminophenyl) phosphate, tri-(4-aminophenyl) phosphite, tri-(4-aminophenyl) thiophosphate, 3,5,4′-triaminobenzanilide, melamine, 3,5,3′,5′-tetraaminobenzophenone, 1,2,4,5-tetraaminobenzene, 2,3,6,7-tetraaminonaphthalene, 3,3′-diaminobenzidine, 3,3′,4,4′-tetra-aminophenyl ether, 3,3′,4,4′-tetraaminodiphenylmethane, 3,3′,4,4′-tetraaminodiphenylsulphone, 3,5-bis-(3,4′-diaminophenyl)-pyridine, 4,4′-diaminodicyclohexylmethane, 1,4-diamino-cyclo-hexane, m-phenylenediamine, p-phenylenediamine, 4,4′-diamino-diphenyl-methane, bis-(4-aminophenyl)-2,2-propane, 4,4′-diamino-diphenyl ether, 4,4′-diaminodiphenylsulphone, 1,5-diaminonaphthalene, m-xylylenediamine, p-xylylenediamine, ethylenediamine, hexamethylenediamine, bis-(γ-aminopropyl)-5,5-dimethyl-hydantoin and 4,4′-diaminotriphenyl phosphate.

The abovementioned amines which are suitable for the process according to the invention, and the processes for their manufacture, are known so that it is superfluous to deal with them in more detail.

For completeness it should be mentioned that polyamines which are obtained by reaction of primary aromatic amines with aldehydes or ketones are also suitable for use as starting materials. In this respect, attention should be drawn to French Patent Specifications Nos. 1,430,977 and 1,481,932.

Mixtures of several polyamines can also be employed according to the invention.

The reaction according to the invention is preferably carried out in the melt or partly in the melt and partly in the solid phase. It can, however, also be carried out in solution.

Where the process is carried out in the melt, temperatures of 150° to 250° C, preferably around 220° C, are suitable. In solution, on the other hand, lower temperatures of, for example, 50° to 150° C can also be employed.

The following substances should be listed as examples of suitable solvents: aromatics, such as xylene and toluene; halogenohydrocarbons, such as trichlorethylene, tetrachloroethane, tetrachloroethylene and chlorobenzene; ethers, such as dioxane, tetrahydrofurane and dibutyl ether; dimethylformamide, tetramethylurea, dimethylsulphoxide and N-methylpyrrolidone.

In some cases, particularly when using mixtures of substances of relatively low reactivity, or when carrying out the polyaddition in solution at lower temperatures, it is advisable to accelerate the reaction by basic catalysts in case (D) also. The catalysts to be used are for practical purposes the same as have already been listed. They should be present in the reaction mixture in a concentration of 0.2 to 10% by weight, preferably 0.5 to 5% by weight, the % by weight data relating to the total amount of the reacting starting components.

The products produced by the reactions, which contain secondary or tertiary amino groups can also act as catalysts in the course of the reaction.

In general, the process (D) according to the invention is carried out starting from reaction mixtures which in addition to the polyimides simultaneously contain polycarboxylic acids and primary polyamines.

However, an alternative possible procedure is first to allow the particular polyimide to react wholly or partly with the particular polycarboxylic acid in the presence of a catalyst and then to allow the remaining reaction with the primary polyamine and, if relevant, with the remaining polycarboxylic acid to take place.

The converse procedure is also possible. First, the particular polyimide can be reacted wholly or partly with the particular primary polyamine. Thereafter, the reaction with the particular polycarboxylic acid and, if relevant, with the remaining primary polyamine is carried out.

In the two procedures last described, a prepolymer is, for practical purposes, prepared first. However, it is also possible to prepare, and further process, a prepolymer as follows: after mixing and, if appropriate, after subsequent grinding, of all the starting products, the powder is first heated for a limited period, preferably to 140° – 170° C. A partially soluble product which is still thermally mouldable results. This prepolymer may at times have to be re-ground to give a workable powder, before it is finally cured in the final processing. The prepolymerisation can also be effected by heating a solution or suspension of the starting materials. The prepolymer process last described is also applicable to the preferred embodiment (C).

The manufacture, according to the invention, of the polyaddition products containing imide groups is, as a rule, carried out with simultaneous shaping to give mouldings, sheet-like structures, laminates, adhesive bonds or foamed plastics. The additives customary in the technology of thermosetting plastics, such as fillers, plasticisers, pigments, dyestuffs, mould release agents and flame-retarding substances can be added to the curable compositions. Examples of fillers which can be used are glass fibres, mica, quartz powder, kaolin, colloidal silicon dioxide or metal powders whilst examples of mould release agents which can be used are various waxes, zinc stearate, calcium stearate and the like.

The products which can be manufactured in accordance with the process of the invention can very simply be moulded by the casting process, using a casting mould.

However, they can also be moulded by hot pressing, using a press. In most cases it suffices to heat the materials only briefly to temperatures of 170° to 250° C under a pressure of 1 to 200 kp/cm² and to complete the curing of the moulding thus obtained outside the press.

The process according to the invention can also be carried out by first producing a prepolymer, suspending or dissolving this in a suitable solvent, then impregnating porous sheet-like structures, such as woven fabrics, fibre mats or fibre fleeces, especially glass fibre mats or glass fibre fabrics, with these solutions or suspensions, removing the solvent by a drying process and finally heating the substrates thus obtained in a press, preferably to 170° – 250° C under a pressure of 5 – 200 kp/cm² pressure. It is also possible only to precure the laminates in the press and to post-cure the products thus obtained in an oven until optimum use properties are achieved.

The process according to the invention, and the polyaddition products which can be manufactured thereby, are above all applicable in the fields of surface protection, the electrical industry, laminating processes and the manufacture of foamed plastics, and in the building industry.

The following comments should be made specifically with regard to the manufacture of foamed plastics.

To manufacture the foam, blowing agents which are still solid at room temperature but decompose at higher temperatures are added to the mixtures. It is possible to use sulphonyl-hydrazides, for example benzenesulphonylhydrazide, p-toluenesulphonylhydrazide or 4,4'-dihydroxybenzenesulphonic acid hydrazide, and also substances such as azodicarboxylic acid amides or $\alpha,\alpha'$-azoisobutyronitrile. Azodicarboxylic acid amide is used preferentially. The density of the new foams is largely determined by the weight ratio of reaction mixture to blowing agent. Preferably, 0.5 – 7% of blowing agent are used.

To achieve a homogeneous pore structure, it is possible also to add a surface-active substance in amounts of 0.1 – 1%, relative to the total amount of the reaction mixture.

Before foaming, the reactants should be ground as finely as possible, and mixed homogeneously. For example, the starting materials can be dissolved or suspended in low-boiling media, such as fluorocarbons, and after a homogeneous mixture has been formed the medium is again removed completely. This process is advisable particularly when a reactant has a low melting point, so that sticking-together might occur on grinding.

To manufacture the cured, foamed mouldings, the mixtures according to the invention, or prepolymers manufactured therefrom, are introduced, together with the blowing agent and the surface-active substance, into a suitable mould which can be sealed if necessary. The foaming, moulding and curing take place in an oven at 80°– 220° C, preferably at 160°– 200° C. The foamed plastic moulding formed can be removed from the mould when it is dimensionally stable at the temperature employed. If necessary, it can be post-cured at the same temperature or at a higher temperature, so as to achieve more advantageous use properties.

The new foamed plastic mouldings can advantageously be employed wherever a foamed material of high heat stability, high heat distortion point, good dielectric properties and high adhesion, even at higher temperatures, is required. Furthermore, they can be employed where the processing of previously known foamed plastics of high heat stability has been associated with considerable difficulties in moulding and processing.

A further subject of the invention are storage-stable, hot-curable mixtures which are characterised in that they contain a) polyimides which contain, per molecule, at least two radicals of the general formula

in which D denotes a divalent radical containing a carbon-carbon double bond, b) polycarboxylic acids and c) the appropriate basic compounds.

These curable mixtures are preferably mixed powders. These are obtained most advantageously by conjointly grinding, or post-grinding, the solid individual components using high intensity grinding equipment (such as, for example, ball mills). From the powder mixture, which in many cases can be employed as such, it is, however, also possible to produce in a known manner, by tabletting, by build-up granulation or by similar processes, a material containing larger particles which is, for example, particularly suitable for the hot pressing process.

MANUFACTURE OF STARTING MATERIALS FOR THE PROCESS ACCORDING TO THE INVENTION

I. Manufacture of a tris-imide of the formula VII a. 294 g (3.0 mols) of maleic anhydride, dissolved in 800 ml of dioxane, are initially introduced into a reaction vessel equipped with a stirrer and thermometer. A solution of 371 g (1 mol) of tris-(4-aminophenyl) phosphate, dissolved in 2.5 liters of dioxane, is added dropwise to the above solution at 10°– 20° C over the course of 4 – 5 hours. After completion of the addition, the mixture is stirred for a further 1½ hours and the reaction product is then filtered off, washed with chloroform and dried. 669 g of a yellowish substance of melting point 127° – 130° C are obtained. According to the analytical data, this substance has the following structure:

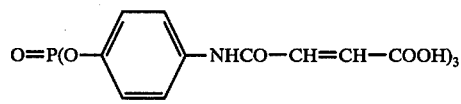

b. 85 g of sodium acetate and 1.1 liters of acetic anhydride are initially introduced into a reaction vessel equipped with a stirrer and thermometer and are warmed to 60° C by means of an oil bath. 945 g of the tris-maleamic acid manufactured according to a) are added in portions to this solution over the course of 30 minutes in such a way that the reaction temperature does not exceed 90° C. After completion of the addition, the mixture is allowed to cool to room temperature and thereafter a mixture of 2 liters of isopropanol and 0.7 liter of water is added dropwise to the reaction product which has partially crystallised out. The substance which has precipitated is filtered off, washed with isopropanol and water until free from acid and dried. 532 g of a substance of melting point 173.5° – 177° C are obtained; according to analytical data, this substance is the tris-maleimide of tris-(4-aminophenyl) phosphate, and has the following structural formula:

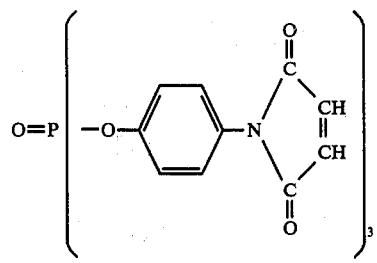

EXAMPLES OF CARRYING OUT THE INVENTION

EXAMPLE 1

86.0 g (0.24 mol) of N,N'-p,p'-diphenylmethane-bis-maleimide, 3.51 g (0.024 mol) of adipic acid and 4.48 g (approx. 5% by weight, relative to the total amount of the reactants) of tetramethyldiaminodiphenylmethane are mixed well, fused in a round-bottomed flask at 180° C and approx. 1 – 3 mm Hg, poured into a mould of dimensions 150 × 150 × 4 mm and heated to 190° C for 14 hours. The mixture is then post-cured for 4 hours at 220° C. The resulting product is mechanically stable and has a heat distortion point (ISO/R 75) above 300° C.

EXAMPLE 2

The procedure followed is analogous to Example 1, but different quantities are employed: 84.5 g (0.236 mol) of N,N'-p,p'-diphenylmethane-bis-maleimide, 3.45 g (0.023 mol) of adipic acid and 8.8 g (approx. 10% by weight) of tetramethyldiaminodiphenylmethane. The heat distortion point of the resulting product is >300° C.

EXAMPLE 3

The procedure followed is analogous to Example 1. The starting products are employed in the following amounts: 80.0 g (0.224 mol) of N,N'-p,p'-diphenylmethane-bis-maleimide, 9.8 g (0.067 mol) of adipic acid and 4.49 g (approx. 5% by weight) of tetramethyldiaminodiphenylmethane.

The heat distortion point is >300° C.

EXAMPLES 4 TO 7

The procedure followed was exactly as in Example 1, except that in part other components were employed and that the ratios were different.

Table 1 lists the starting products and their amounts used in the various examples, and Table 2 lists the test results.

Table 1

| Example | Polyimide | g | mol | Dicarboxylic acid | g | mol | Catalyst | g | % |
|---|---|---|---|---|---|---|---|---|---|
| 4 | N,N-p,p-diphenyl-bis-maleimide | 77.0 | 0.215 | Sebacic acid | 13.0 | 0.0645 | TMDM | 4.5 | 5.0 |
| 5 | " | 84.0 | 0.232 | Adipic acid | 10.27 | 0.07 | TEDA | 0.94 | 1.0 |
| 6 | " | 77.7 | 0.217 | Adipic acid | 9.51 | 0.065 | TMDM | 8.72 | 10.0 |
| 7 | " | 75.0 | 0.21 | Adipic acid | 15.30 | 0.105 | TMDM | 4.52 | 5.0 |

Abbreviations:
TMDM: Tetramethyldiaminodiphenylmethane
TEDA: Triethylenediamine

Table 2

| Example | Flexural strength (VSM 77,103) in kg/mm² Original | After 10 days at 270° C | i.e. Change % | Heat distortion point (ISO/R 75) ° C |
|---|---|---|---|---|
| 4 | 6.43 | — | — | 300 |
| 5 | 6.19 | 7.18 | +16 | 300 |
| 6 | 8.41 | — | — | 291 |
| 7 | 7.71 | — | — | 280 |

EXAMPLE 8

68.0 g (0.19 mol) of N,N'-p,p'-diphenylmethane-bis-maleimide, 11.1 g (0.076 mol) of adipic acid and 15.05 g (0.076 mol) of 4,4'-diaminodiphenylmethane are mixed well, fused in a round flask at 180° C and approx. 15 mm Hg, poured into a mould of dimensions 150 × 150 × 4 mm and heated for 14 hours to 190° C. The mixture is then post-cured for 4 hours at 220° C. The properties measured are listed in Table 2.

EXAMPLES 9 TO 12

In the examples which follow, the procedure followed is analogous to Example 1, except that the ratios of the components are varied. Table 1 gives a survey of the reactants and of their amounts used.

EXAMPLES 13 AND 14 (COMPARISON EXAMPLES)

In these examples, the technical teaching of French Pat. No. 1,555,564 is followed. The ratios used are again summarised in Table 1, and the test results in Table 2. The reaction mixture was cured in the following manner: 1.5 hours at 140° C, 1.5 hours at 160° C, 1.5 hours at 180° C and 1.5 hours at 200° C.

DISCUSSION OF EXAMPLES 8 TO 14 AND OF THE EXPERIMENTAL RESULTS

It can be seen from Tables 3 and 4 that the polyadducts manufactured according to the process of the invention (Examples 8 to 12) in all cases have a higher heat distortion point than the polyadducts which have been manufactured according to French Patent No. 1,555,564 (Examples 13 and 14). In most cases the products manufactured according to the invention also have a superior flexural strength and a superior impact strength. The superiority with regard to the heat distortion is particularly marked in some cases.

Table 3

| | Polyimide employed | | | Polycarboxylic acid employed | | | Polyamine employed | | |
|---|---|---|---|---|---|---|---|---|---|
| Example | Type | Amount g | mol | Type | Amount g | mol or equivalent | Type | Amount g | mol |
| 8 | N,N'-p,p'-diphenylmethane-bis-maleimide | 68.0 | 0.19 | Adipic acid | 11.1 | 0.076 mol | 4,4'-diaminodiphenylmethane | 15.05 | 0.076 |
| 9 | " | 68.0 | 0.19 | " | 5.55 | 0.038 mol | " | 15.05 | 0.076 |
| 10 | " | 71.6 | 0.20 | " | 17.5 | 0.12 eq. | " | 9.9 | 0.05 |
| 11 | " | 71.6 | 0.20 | " | 11.7 | 0.08 eq. | " | 9.9 | 0.05 |
| 12 | " | 75.2 | 0.21 | " | 6.1 | 0.042 eq. | " | 10.4 | 0.0525 |
| 13 | " | 72.0 | 0.20 | — | — | — | — | 19.8 | 0.10 |
| 14 | " | 106.4 | 0.30 | — | — | — | " | 23.6 | 0.12 |

Table 4

| Ex. | Flexural strength according to VSM 77,103* kg/mm² | Impact strength according to VSM 77,105* cmkg/cm² | Heat distortion point according to ISO/R 75** ° C |
|---|---|---|---|
| 8 | 12.57 | 11.18 | 234 |
| 9 | 15.36 | 12.28 | 237 |
| 10 | 11.78 | 5.38 | 230 |
| 11 | 11.47 | 7.69 | 263 |
| 12 | 12.78 | 8.18 | 261 |
| 13 | 9.2 | 6.9 | 209 |
| 14 | 11.3 | 9.9 | 224 |

*VSM = Standards of the Verein Schweizerischer Maschinenindustrieller
**ISO/R = Standards of the International Standard Organisation/Recommendation

EXAMPLES 15 TO 20

The procedure followed was identical to that of Example 8, but with the difference that, in part, other components were employed and that the quantity ratios were different.

Table 5 lists the starting products and the amounts thereof and Table 6 lists the test results.

Table 5

| Example | Polyimide | g | mol | Dicarboxylic acid | g | mol | Diamine | g | mol |
|---|---|---|---|---|---|---|---|---|---|
| 15 | N,N-p,p-diphenylmethane-bis-maleimide | 59.9 | 0.167 | Sebacic acid | 16.9 | 0.084 | DADPM | 6.62 | 0.033 |
| 16 | " | 61.5 | 0.172 | Suberic acid | 14.94 | 0.086 | " | 6.8 | 0.034 |
| 17 | " | 75.2 | 0.21 | Adipic acid | 6.1 | 0.042 | " | 10.4 | 0.053 |
| 18 | " | 71.6 | 0.20 | Adipic acid | 17.5 | 0.12 | " | 9.9 | 0.05 |
| 19 | " | 69.1 | 0.193 | Adipic acid | 11.3 | 0.077 | DADE | 9.6 | 0.048 |
| 20 | " | 68.5 | 0.191 | Adipic acid | 11.2 | 0.0769 | TDA | 10.3 | 0.048 |

Abbreviations:
DADPM: 4,4'-diaminophenylmethane
DADE: diaminodiphenyl ether
TDA: thiodianiline Table 6

| Example | Flexural strength (VSM 77,103) in kg/mm² original | after 10 days at 270° C | i.e. change % | Heat distortion point (ISO/R 75) ° C |
|---|---|---|---|---|
| 15 | 7.98 | — | — | 250 |
| 16 | 6.45 | — | — | 274 |
| 17 | 7.52 | — | — | 297 |
| 18 | 8.38 | — | — | 281 |
| 19 | 7.51 | 8.30 | + 10.5 | 300 |
| 20 | 8.79 | 9.73 | + 10.7 | 300 |

EXAMPLE 21

252 g of N,N'-4,4'-diphenylmethane-bis-maleimide (1 mol), 30.8 g of adipic acid (0.3 mol) and 2.8 g of a silicone foam stabiliser (Si 3,193) are ground in a ball mill and then (so-called) "advanced" in a kneader at 160° C for 40 minutes.

The mixture thus obtained is ground with 2.8 g of triethylenediamine in a ball mill. 0.5 g of azodicarboxylic acid amide (blowing agent) are admixed to 15 g of the resulting powder and this mixture is again ground.

10 g of this powder are introduced into a metal mould pre-warmed to 160° C.

After curing for 1 hour at 160° C, followed by 1 hour at 180° C, the mould is opened. The resulting foamed moulding is found to have filled the mould well. It has a density of 0.3 g/cm³. A uniform pore structure is obtained.

EXAMPLE 22

If 7 g of the powder mixed with blowing agent, according to Example 1, are introduced into the metal mould mentioned in Example 21, which again was pre-warmed to 160° C, a foamed plastic of density 0.2 g/cm³ is obtained under the same conditions.

What we claim is:

1. Process for the manufacture of a polyaddition product containing imide groups, said process consisting essentially of reacting a polyimide which contains, per molecule, at least two radicals of the general formula

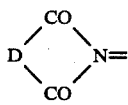  (I)

in which D denotes a divalent radical containing a carbon-carbon double bond, with a saturated aliphatic polycarboxylic acid in the presence of a di-, tri- or tetra-primary amine with 2 to 40 carbon atoms or a primary polyamine obtained by reaction of a primary aromatic amine with an aldehyde or ketone, said primary polyamine being employed in such a ratio as to provide, per 1 equivalent of polyimide, such an amount of polycarboxylic acid and primary polyamine that the sum of the equivalents of said polycarboxylic acid and said polyamine is 0.3 to 1.5 equivalents and the equivalent ratio of said polycarboxylic acid to said polyamine is 1:1 to 4:1, at temperatures between 50° and 280° C to provide a polyaddition product in which said polycarboxylic acid forms a part.

2. A storage-stable, hot-curable mixture, said mixture consisting essentially of
   (a) a polyimide which contains, per molecule, at least two radicals of the general formula

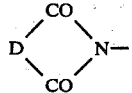  (I)

in which D denotes a divalent radical containing a carbon-carbon double bond,
   (b) saturated aliphatic polycarboxylic acid, and
   (c) a di-, tri- or tetra- primary amine with 2 to 40 carbon atoms or a primary polyamine obtained by reaction of a primary aromatic amine with an aldehyde or ketone, wherein the reactants are present in such a ratio as to provide, per 1 equivalent of polyimide, such an amount of polycarboxylic acid and primary amine that the sum of the equivalents of said polycarboxylic acid and said primary polyamine is 0.3 to 1.5 equivalents and the equivalent ratio of said polycarboxylic acid to said polyamine is 1:1 to 4:1.

3. Process according to claim 1, wherein the reaction is allowed to take place at temperatures of 150° to 250° C.

4. Process according to claim 1, wherein a polyimide with radicals of the formula (I), in which D represents a divalent radical of the formula

  (II)

wherein R denotes hydrogen or methyl, is employed.

5. Process according to claim 1, wherein a polyimide which contain two or three radicals of the formula (I) per molecule is employed.

6. Process according to claim 1, wherein the polyimide employed is a compound of the general formula

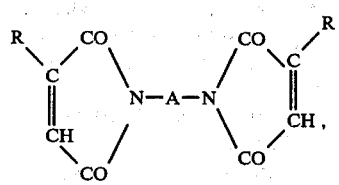  (III)

in which A denotes a divalent organic radical with 2 to 30 C atoms.

7. Process according to claim 6, wherein the polyimide employed is a compound of the formula (III) in which A denotes a radical of the formula

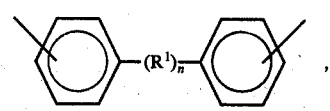  (IV)

wherein R¹ represents one of the radicals —CH₂—,

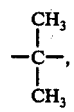

—SO₂—, —SO—, —S— and —O— and n is 0 or 1.

8. Process according to claim 7, wherein N,N'-4,4'-diphenylmethane-bis-maleimide is employed as the polyimide.

9. Process according to claim 1, wherein saturated aliphatic polycarboxylic acid with a total of 4 to 10 C atoms is employed.

10. Process according to claim 1, wherein adipic acid or sebacic acid is employed.

11. Process according to claim 1, wherein a dicarboxylic acid is employed as the polycarboxylic acid.

12. Process according to claim 1, wherein the primary polyamine employed is an aromatic or an araliphatic, di-primary or tri-primary amine with 2 to 40 C atoms.

13. Process according to claim 1, wherein a compound of the formula

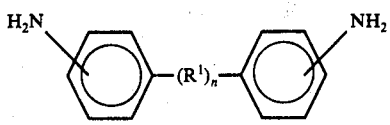 (VI)

is employed as the primary polyamine.

14. Process according to claim 13, wherein 4,4'-diaminodiphenylmethane is employed.

15. Process according to claim 1, wherein the reaction is allowed to take place in the presence of a basic catalyst selected from tertiary, secondary or primary amines, or amines which contain several different types of amino groups, which differ from the products produced during the reaction, in a concentration of 0.2 to 10% by weight, relative to the total amount of the reactants.

16. Process according to claim 15, wherein a tertiary, secondary or mixed tertiary-secondary amine is employed as catalyst.

17. Process according to claim 15, wherein the catalyst is employed in a concentration of 0.5 to 5% by weight.

18. Process according to claim 1, wherein it starts from a reaction mixture which in addition to the polyimide simultaneously contains a polycarboxylic acid and a primary polyamine.

19. Polyaddition product manufactured by the process according to claim 1.

20. A mixture according to claim 2, said mixture containing a polyimide with radicals of the formula (I) in which D represents a divalent radical of the formula

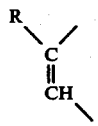 (II)

wherein R denotes hydrogen or methyl.

21. A mixture according to claim 2, said mixture containing a polyimide which possesses two or three radicals of the formula (I) per molecule.

22. A mixture according to claim 20, said mixture containing, as the polyimide, a compound of the general formula

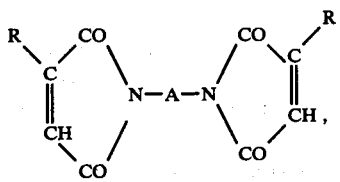 (III)

in which A denotes a divalent organic radical with 2 to 30 C atoms.

23. A mixture according to claim 22, said mixture containing, as the polyimide, a compound of the formula (III), in which A denotes a radical of the formula

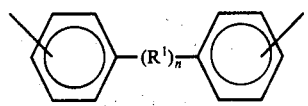 (IV)

wherein $R^1$ represents one of the radicals —$CH_2$,

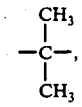

—$SO_2$—, —SO—, —S— and —O— and $n$ is 0 or 1.

24. A mixture according to claim 23, said mixture containing N,N'-4,4'-diphenylmethane-bis-maleimide as the polyimide.

25. A mixture according to claim 2, said mixture containing a saturated aliphatic polycarboxylic acid with a total of 4 to 10 C atoms.

26. A mixture according to claim 25, said mixture containing adipic acid or sebacic acid.

27. A mixture according to claim 2, said mixture containing a dicarboxylic acid as the polycarboxylic acid.

28. A mixture according to claim 2, said mixture containing an aromatic or an araliphatic, di-primary or tri-primary amine with 2 to 40 C atoms as the primary polyamine.

29. A mixture according to claim 28, said mixture containing a compound of the formula

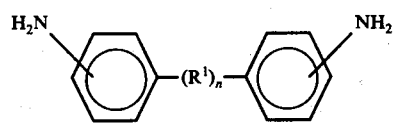 (VI)

as the primary polyamine.

30. A mixture according to claim 29, said mixture containing 4,4'-diaminodiphenylmethane.

31. A mixture according to claim 2, said mixture additionally containing a basic catalyst which is selected from tertiary, secondary or primary amines, or amines which contain several different types of amino groups, and differ from the products produced during the reaction, in a concentration of 0.2 to 10% by weight, relative to the total amount of the reactants.

32. A mixture according to claim 31, said mixture containing the basic catalyst in a concentration of 0.5 to 5% by weight.

33. A mixture according to claim 31, said mixture containing a tertiary, secondary or mixed tertiary-secondary amines as catalyst.

34. Process according to claim 1, characterized in that first the reaction of the particular polyimide with the particular polycarboxylic acid is allowed to take place completely or partially, in the presence of a catalyst, and thereafter the reaction of the reaction mixture thus obtained with the particular primary polyamine, or the terminal reaction, is allowed to take place.

* * * * *